(12) United States Patent
Hanson et al.

(10) Patent No.: US 11,149,872 B2
(45) Date of Patent: Oct. 19, 2021

(54) METHOD AND SYSTEM FOR FAIL-SAFE CONTROL OF ELECTRIC ACTUATORS

(71) Applicant: 1593417 Alberta Ltd., Edmonton (CA)

(72) Inventors: Garth Steven Hanson, Edmonton (CA); Thomas Joseph MacArthur, Edmonton (CA); Henri Richard Tessier, Beaumont (CA)

(73) Assignee: 1593417 Alberta Ltd., Edmonton (CA)

( * ) Notice: Subject to any disclaimer, the term of this patent is extended or adjusted under 35 U.S.C. 154(b) by 65 days.

(21) Appl. No.: 16/352,511

(22) Filed: Mar. 13, 2019

(65) Prior Publication Data

US 2019/0331247 A1 Oct. 31, 2019

Related U.S. Application Data

(60) Provisional application No. 62/663,248, filed on Apr. 26, 2018.

(51) Int. Cl.
*F16K 31/04* (2006.01)
*G05B 19/4063* (2006.01)

(52) U.S. Cl.
CPC ........ *F16K 31/047* (2013.01); *G05B 19/4063* (2013.01); *G05B 2219/41309* (2013.01); *G05B 2219/50082* (2013.01)

(58) Field of Classification Search
CPC . F16K 31/047; F16K 31/046; G05B 19/4063; G05B 2219/41309; G05B 2219/50082; G05B 9/03
See application file for complete search history.

(56) References Cited

U.S. PATENT DOCUMENTS

| | | | | |
|---|---|---|---|---|
| 4,919,596 A | * | 4/1990 | Slate | A61M 5/172 417/18 |
| 5,414,861 A | * | 5/1995 | Horning | G06F 1/30 365/229 |
| 5,422,808 A | * | 6/1995 | Catanese, Jr. | G05B 19/4063 307/132 E |
| 5,440,487 A | * | 8/1995 | Althoff | B62D 7/148 180/404 |
| 5,744,876 A | * | 4/1998 | Fangio | B60G 21/0555 307/108 |
| 5,744,923 A | * | 4/1998 | Strauss | G05B 9/02 318/430 |
| 8,018,094 B1 | * | 9/2011 | Jai | G06F 1/263 307/80 |
| 9,583,974 B1 | * | 2/2017 | Ahsanullah | H02J 9/062 |
| 2015/0137605 A1 | * | 5/2015 | Spivey | H02J 9/061 307/66 |

* cited by examiner

*Primary Examiner* — Thomas C Lee
*Assistant Examiner* — Michael Tang
(74) *Attorney, Agent, or Firm* — Scott Griggs; Griggs Bergen LLP

(57) ABSTRACT

A method and system are provided for supplying back-up electric power to an electric actuator powered by a supply of main electric power, and to interrupt or to replace a control signal supplied to the actuator so that the actuator can be reverted to a fail-safe mode, condition or position when there is a failure or disruption of the main electric power or when the control signal is not within the accepted pre-determined standard or range for the control signal.

18 Claims, 1 Drawing Sheet

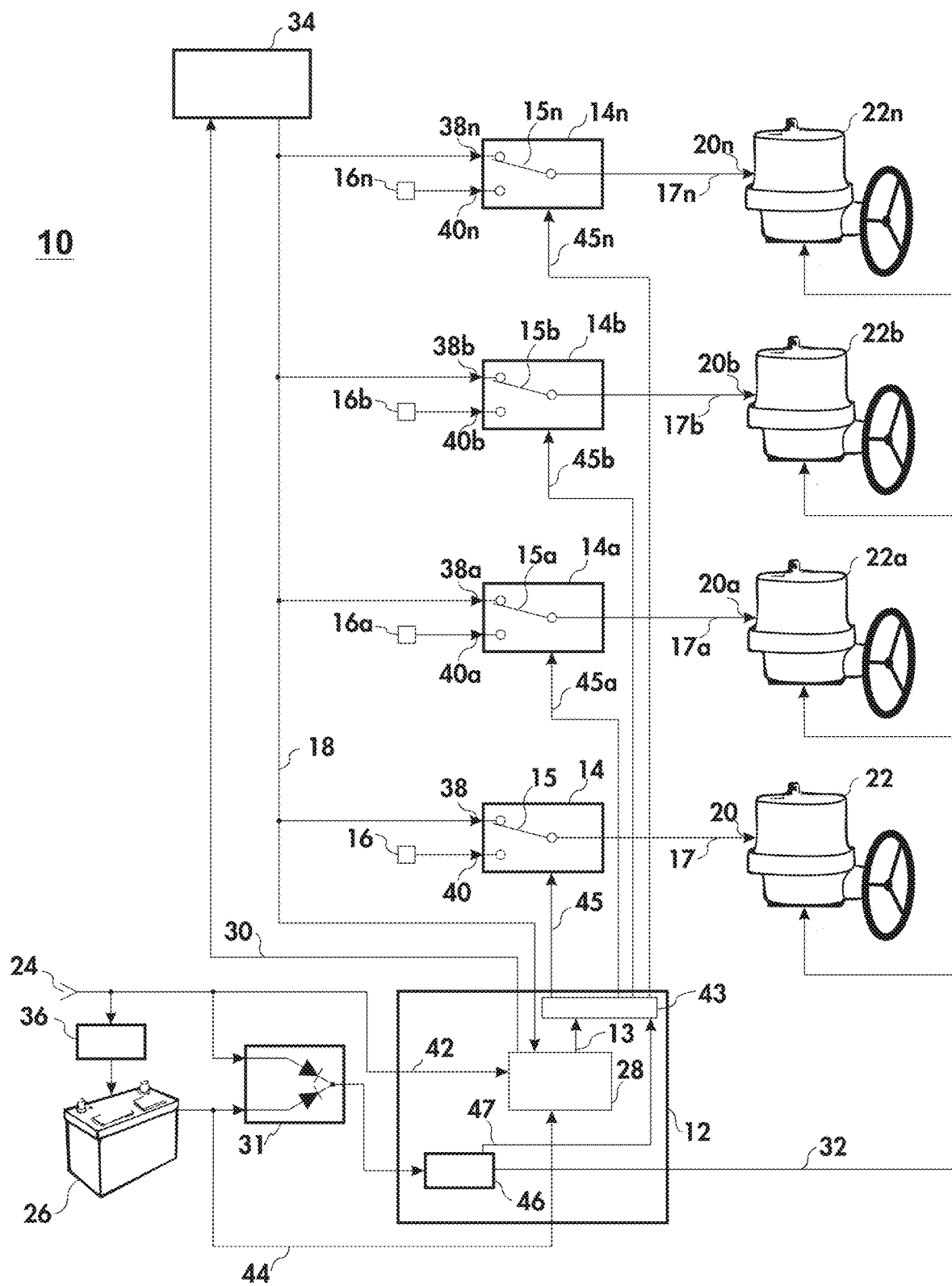

METHOD AND SYSTEM FOR FAIL-SAFE CONTROL OF ELECTRIC ACTUATORS

PRIORITY STATEMENT & CROSS-REFERENCE TO RELATED APPLICATIONS

This application claims priority of U.S. Provisional Patent Application Ser. No. 62/663,248 filed Apr. 26, 2018, which is incorporated by reference into this application in its entirety.

TECHNICAL FIELD OF THE INVENTION

The present disclosure is related to the field of controlling electric actuators to fail-safe conditions, in particular, when electric power to the actuators has failed.

BACKGROUND OF THE INVENTION

In the Province of Alberta, Canada, there are initiatives to reduce methane emissions to the atmosphere from oil and gas extraction activities.

Methane emissions in 2014 from Alberta's oil and gas sector were 31.4 megatonnes of carbon dioxide equivalents. This accounted for 70% of provincial methane emissions and 25% of all emissions from the upstream oil and gas sector.

48% of these methane emissions are from direct venting or venting from equipment, 46% comes from fugitive emissions or leaks, and the remaining 6% are from flaring or other sources. The venting of methane arises from the use of well gas to operate pneumatically-operated valves and equipment at well sites, which ultimately results in billions of cubic meters of greenhouse gases being vented directly to the atmosphere.

The Alberta provincial government has undertaken three carbon offset protocols to support methane reductions in the oil and gas sector: an offset protocol to encourage converting existing pneumatic equipment to highly efficient options; an offset protocol for solution gas conservation; an offset protocol for engine fuel management and vent gas capture projects.

Cutting methane emissions is the most cost-effective way to accelerate greenhouse gas reductions. The Alberta provincial government proposes to reduce methane emissions from oil and gas operations by 45% by 2025 using the following approaches: applying new emissions design standards to new Alberta facilities as applying standards at the planning stage will be less expensive; improving measurement and reporting of methane emissions, as well as leak detection and repair requirements; developing a joint initiative on methane reduction and verification for existing facilities, and backstopping this with regulated standards that take effect in 2020, to ensure the 2025 target is met.

In Alberta, the implementation of new oil and gas methane standards will be led by the Alberta Energy Regulator, in collaboration with Alberta Energy and the Alberta Climate Change Office. Alberta's reduction target and timeline will match the commitments recently announced by the Canadian and American federal governments and are consistent with the approach of protecting economic competitiveness through alignment with North American environmental standards One method of accomplishing this is to replace well gas powered pneumatic equipment with electric actuators that are functionally equivalent. With pneumatic equipment, mechanical fail-safe componentry, such as springs, are used to operate the equipment to a fail-safe mode, condition or position when the well gas is removed from the equipment. With electric actuators to replace the pneumatic equipment, other means will be required to operate the electric actuators to a fail-safe mode, condition or position should the electric power supplied to the electric actuators become interrupted or fail.

It is, therefore, desirable to provide a method and system to operate electric actuators to a fail-safe mode, condition or position when electric power supplied to the electric actuators fails or becomes interrupted.

SUMMARY OF THE INVENTION

A method and system are provided for the fail-safe control of electric actuators.

In some embodiments, the method and system can supply back-up electric power to an electric actuator powered by a supply of main electric power, and to interrupt a control signal to the actuator so that the actuator can be reverted to a fail-safe mode, condition or position when there is a failure or disruption of the main electric power.

Broadly stated, in some embodiments, a method can be provided for controlling an electric actuator in the event of an interruption of a supply of main electric power operatively coupled to an electric power input disposed on the electric actuator, the electric actuator comprising an actuator control signal input disposed on the electric actuator wherein the actuator control signal input is operatively coupled to an actuator controller, the actuator controller configured to control the electric actuator with an actuator control signal supplied to actuator control signal input, the method comprising the steps of: supplying an alternate source of electric power to the electric power input when the supply of main electric power is interrupted; and disconnecting the actuator control signal from the actuator control signal input when the supply of main electric power is interrupted.

Broadly stated, in some embodiments, the method can further comprise the step of supplying a fail-safe command signal to the actuator control signal input when the supply of main electric power is interrupted.

Broadly stated, in some embodiments, the method can further comprise the step of sequencing a plurality of fail-safe command signals to the actuator control signal input of a plurality of electric actuators.

Broadly stated, in some embodiments the method can further comprise the step of sequencing the plurality of fail-safe command signals one at a time.

Broadly stated, in some embodiments, the method can further comprise the step of disconnecting the fail-safe command signal from the actuator control signal input and reconnecting the actuator control signal to the actuator control signal input when the supply of main electric power is restored.

Broadly stated, in some embodiments, the method can further comprise the step of supplying the electric actuator with the supply main electric power when the supply of main electric power is restored.

Broadly stated, in some embodiments, the method can further comprise the step of supplying an electric power failure signal to the actuator controller when the supply of main electric power is interrupted.

Broadly stated, in some embodiments, the method can further comprise the step of monitoring the actuator control signal and determining if the actuator control signal is within an accepted pre-determined standard or range for the actuator control signal.

Broadly stated, in some embodiments, the method can further comprise the step of moving or operating the electric actuator to a fail-safe position, condition or state if the actuator control signal is not within the accepted pre-determined standard or range for the actuator control signal.

Broadly stated, in some embodiments, a system can be provided for controlling an electric actuator in the event of an interruption of a supply of main electric power operatively coupled to an electric power input disposed on the electric actuator, the electric actuator comprising an actuator control signal input disposed on the electric actuator wherein the actuator control signal input is operatively coupled to an actuator controller, the actuator controller configured to control the electric actuator with an actuator control signal supplied to actuator control signal input, the apparatus comprising: a main control unit configured to supply an alternate source of electric power to the electric power input when the supply of main electric power is interrupted; and a control signal interface unit configured to disconnect the actuator control signal from the actuator control signal input when the supply of main electric power is interrupted.

Broadly stated, in some embodiments, the control signal interface unit can be configured to supply a fail-safe command signal to the actuator control signal input when the supply of main electric power is interrupted.

Broadly stated, in some embodiments, the system can further comprise a sequencer configured to sequence a plurality of fail-safe command signals to the actuator control signal input of a plurality of electric actuators.

Broadly stated, in some embodiments, the sequencer can be configured to sequence a plurality of fail-safe command signals to the actuator control signal input of a plurality of electric actuators.

Broadly stated, in some embodiments, the control signal interface unit can be configured to disconnect the fail-safe command signal from the actuator control signal input and to reconnect the actuator control signal to the actuator control signal input when the supply of main electric power is restored.

Broadly stated, in some embodiments, the main control unit can be configured to supply the electric actuator with the supply main electric power when the supply of main electric power is restored.

Broadly stated, in some embodiments, the main control unit can be configured to supply an electric power failure signal to the actuator controller when the supply of main electric power is interrupted.

Broadly stated, in some embodiments, the control signal interface unit can be configured to monitor the actuator control signal and to determine if the actuator control signal is within an accepted pre-determined standard or range for the actuator control signal.

Broadly stated, in some embodiments, the control signal interface unit can be further configured to operate the electric actuator to a fail-safe position, condition or state if the actuator control signal is not within the accepted pre-determined standard or range for the actuator control signal.

BRIEF DESCRIPTION OF THE DRAWINGS

FIG. 1 is a block diagram depicting one embodiment of a system for the fail-safe control of electric actuators.

DETAILED DESCRIPTION OF EMBODIMENTS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Referring to FIG. 1, one embodiment fail-safe control system 10 is shown. In some embodiments, system 10 can comprise main control unit 12 and control signal interface unit 14. Main control unit 12 can be operatively coupled to control signal interface unit 14 via power fail control signal 13, sequencer 43 and sequencer control lines 45, 45a, 45b . . . 45n emanating therefrom. For the illustrative purposes only, main control unit and control signal interface unit 14 are shown as separate structural elements but this representation is to merely show functional features of system 10. In some embodiments, main control unit 12 and control signal interface unit 14 can be configured as separate structural elements while in other embodiments, main control unit 12 and control signal interface unit 14 can be functional configured in a single electronic apparatus such as a microcontroller, a programmable logic controller or any other functionally equivalent electronic apparatus as well known to those skilled in the art.

In some embodiments, a supply of main electric power 24 and a supply of back-up electric power 26 can be operatively coupled to main control unit 12 that can route one or the other to electric actuator 22 via actuator power line input 32. In some embodiments, back-up electric power 26 can comprise one or more of batteries, super capacitors, power inverters, voltage converters, solar panels and any other electric power generation or storage equipment as well known to those skilled in the art.

In some embodiments, representative examples of actuator can include one or more of L-Series, S-Series and M-Series actuators produced by Indelac Controls Inc. of Florence, Ky., USA; Q6-Series, QX-Series and ADC-Series of Valvconactuators produced by Metso Group of Helsinki, Finland; and Series 75 actuators produced by Flowserve Corporation of Irving, Tex., USA although other functionally equivalent actuators can be used as well-known to those skilled in the art. In some embodiments, the selection of which of main electric power 24 and back-up electric power 26 that is supplied to power line input 32 disposed on actuator 22 can be implemented through power redundancy module 31, represented in FIG. 1 as "diode" symbols. In some embodiments, power redundancy module 31 can comprise one or more of electro-mechanical switching devices, such as relays, and of solid state devices, such as diodes, diacs, triacs, silicon-controlled rectifiers, bipolar transistors, insulated gate bipolar transistors, field effect transistors, metal oxide semiconductor field effect transistors, solid state relays and any other functionally equivalent electronic device configured to switch electric power as well known to those skilled in the art. In some embodiments, main control unit 12 can provide the means to connect either of main electric power 24 and back-up electric power 26, but not both, to electric power line input 32 disposed on actuator 22. Such connecting means can comprise one or more of passive switching electronic components such as diodes, electro-mechanical components such as relays, solid state switching components such as solid-state relays, triacs, silicon-controlled rectifiers, transistors, field-effect transistors and other similar functioning devices or components as well known to those skilled in the art. In some embodiments, power redundancy module 31 can be configured to select the power source that has the highest voltage although in other embodiments, power redundancy module 31 can select main electric power 24 and switch to back-up electric power 26 only when main electric power 24 has failed or dropped below a predetermined or configured voltage setpoint or threshold.

In some embodiments control signal interface unit 14 can receive control signal 18 from actuator controller 34. But for the installation and implementation of system 10, control signal would be connected to control signal input 20 disposed on actuator 22. In some embodiments, actuator controller 34 can comprise a microcontroller, a programmable logic controller, a general purpose computer, a discrete switch, a level sensor, a pressure sensor or any other functionally equivalent device configured to control actuator 22, as well known to those skilled in the art. In some embodiments, control signal 18 from actuator controller 34 can be connected to signal input 38 disposed on control signal interface unit 14, that can be connected to signal switch 15 disposed within control signal interface unit 14 that can be, in turn, routed to signal output 17 and then routed to control signal input 20 disposed on actuator 22. For illustrative purposes only, signal switch 15 is shown in FIG. 1 as a single-pole, double-throw switch symbol although signal switch 15 can comprise one or more of electro-mechanical switching devices, such as relays, and of solid state devices, such as diodes, diacs, triacs, silicon-controlled rectifiers, bipolar transistors, insulated gate bipolar transistors, field effect transistors, metal oxide semiconductor field effect transistors, solid state relays, logic circuitry disposed in a microcontroller or programmable logic controller ("PLC") and any other functionally equivalent electronic device configured to switch electric signals as well known to those skilled in the art.

Under normal operating conditions, when a supply of main electric power 24 is available, main electric power 24 can be routed through main control unit 12 to power line input 32, and control signal 18 from actuator controller 34 can be routed through control signal interface unit 14 to control signal input 20. Upon actuator controller 34 sending an actuating signal on control signal 18, actuator 22 can be actuated to operate whatever equipment actuator 22 is operatively coupled to.

In some embodiments, fault detector circuit 28 can monitor one or more of: the status of main electric power 24; the status of backup electric power 26; and the status of control signal 18. When one or more of these indicate an error condition, fault detector circuit 28 can cause control signal 18 to become disconnected from control signal input 20 of actuator 22, and to optionally replace control signal 18 with fail-safe command signal 16, an over-ride signal that can cause actuator 22 to move, operate or actuate to a safe position, condition or state. While some actuators can move to a safe position upon the loss of control signal 18 on their own, other actuators can stay in its operate position, thus requiring an over-ride signal to command it to a safe position, condition or state.

In the event that the supply of main electric power 24 fails, or is otherwise interrupted, fail detector circuit 28 disposed within main control unit 12 can detect the lack of main electric power by monitoring main voltage 42 on main power electric power 24. In some embodiments, fail detector circuit 28 can also detect backup voltage of backup electric power 26 via backup voltage monitor sense line 44. When main electric power 24 fails, power redundancy module 31 can connect back-up electric power 26 to actuator 22. In some embodiments, power redundancy module 31 can comprise electric components, such as diodes and other functionally equivalent electrical components, as well-known to those skilled in the art, which can switch between the power sources without a control signal supplied thereto to allow the higher voltage power source to provide electric power to pass through to actuator 22. In addition, failure detection circuit 28 can send fail control signal 13 to sequencer 43 and then, subsequently, to control signal interface unit 14 to operate signal switch 15 to disconnect control signal 18 from control signal input 20. In some embodiments, signal switch 15 can comprise the normally open contacts disposed in an electromagnetic relay wherein the electromagnetic coil of the relay can be energized by one or both of main voltage 42 and backup voltage monitor sense line 44 wherein the normally open contacts close thus connecting control signal 18 to actuator 22. Upon failure of the main and/or backup power, the relay coil becomes de-energized causing the relay contacts to open and interrupt control signal 18. In other embodiments, the failure of the power de-energizing the relay coil can connect fail-safe command signal 16 through the normally closed contacts of the relay to actuator 22.

In some embodiments, one or both of main control unit 12 and fault detector circuit 28 can comprise an analogue electronic circuit comprised of one or more of operational amplifiers, comparators, transistors, field-effect transistors and resistors to measure one or both of main voltage monitor sense line 42 and backup voltage monitor sense line 44. In some embodiments, one or both of main control unit 12 and fault detector circuit 28 can comprise a digital electronic circuit comprised of one or more of analogue-to-digital converters, microcontrollers, microprocessors, central processing units, programmable logic controllers and opto-isolators to measure one or both of main voltage monitor sense line 42 and backup voltage monitor sense line 44.

In some embodiments, control signal 18 can comprise any type of control signal as well known to those skilled in the art. In some embodiments, control signal 18 can comprise an analog signal such as 4-20 milliamp current. In other embodiments, control signal 18 can comprise a discrete voltage, such as 5 volt DC logic, 12 volt DC logic or 24 volt DC logic. In other embodiments, control signal 18 can comprise a digital signal conforming to a communication protocol, such as Modbus™ protocol. Thus, when there is a failure or interruption of main electric power 24, signal switch 15 can operate to disconnect control signal from actuator 22 whereby actuator 22 can revert to an inactivated state. In other embodiments, actuator 22 can be configured to automatically revert to an inactivated state when there is a loss of electrical power supplied to actuator 22.

In some embodiments, system 10 can be configured to monitor the "health" of control signal 18 from actuator controller to determine if control signal 18 is operating within an acceptable pre-determined standard or range for control signal 18. As an example, for 4-20 milliamp current systems, control signal 18 can be monitored via a series current measurement to ensure that the current is within the range of 4 to 20 milliamps. In other embodiments using Modbus™ protocol, system 10 can monitor, for example, if a valid Modbus™ poll signal is received with a certain time window. In some embodiments, the control signal can be tapped and simply monitored for any activity to verify that there is electrical continuity and that polls are occurring. In other embodiments, the control signal can be tapped and monitored by decoding the serial protocol, verifying that commands, responses and/or cyclical redundancy checks are valid. In other embodiments, the control signal can be intercepted, buffered and decoded to verify that commands, responses and/or cyclical redundancy checks are valid, and passing the packets to the actuator while optionally replacing the invalid packets with valid command packets that command actuator 22 to move to the fail-safe position, condition or state. For control signals using a discrete voltage on/off signals that command the actuator to open or close, the voltage levels can be monitored to verify that they are within a valid range, for example, 0-1 volt ="off"; 10-14 volts ="on".

In embodiments where actuator controller 34 is configured to provide a "heartbeat" signal, that is, the actuator is being commanded to stay open, rather than apply an open signal continuously or, alternatively, applying no signal thereby commanding the actuator to remain in place. The pulse width of the heartbeat signal and its duty-cycle can be measured by main control unit 12 with fault detector circuit 28, as shown in FIG. 1, to verify that these measurements are within expected values for such parameters.

Thus, in some embodiments, if control signal 18 does not comply with acceptable standards or range for the specific type of control signal 18 being used, then system 10 can then move or operate actuator 22 to a fail-safe position.

In some embodiments, fail-safe command signal 16 can operatively coupled to signal input 40 whereupon failure of main electric power 24, signal switch 15 operates to connect fail-safe command signal 16 to control signal input 20 to command actuator 22 to operate to a fail-safe mode, condition or position, as the case may be.

In some embodiments, failure detection circuit 28 can optionally send power fail signal 30 to actuator controller 34 upon failure or disruption of main electric power 24 as an advisory signal to actuator controller 34, that can then take further action as needed or as programmed into actuator controller 34.

In some embodiments, system 10 can further comprise battery charger 36 operatively coupled to main electric power 24, wherein charger 36 can be operatively coupled to back-up electric power 26 to charge any batteries disposed therein when main electric power 24 is available so that there is sufficient back-up power available in the event of a failure or disruption of main electric power 24.

In some embodiments, multiple actuators 22 can be installed at a single location where one or more back-up electric power 26 systems can be shared amongst all of the various systems 10. In the situation of a failure of main electric power 24, all of the actuators could attempt to move simultaneously, which could require a relatively large backup power source. To alleviate this, in some embodiments, sequencer 43 can be used to stagger the operation of their respective actuators as a means to limit the peak current required to move all the actuators to a fail-safe position. Each actuator 22 would need its own sequencer control line, depicted as 45a, 45b . . . 45n in FIG. 1. In some embodiments, sequencer 43 can allow each of actuators 22a, 22b . . . 22n to be activated to a fail-safe position or condition at different times via their own separate and dedicated control signal interfaces connected thereto (shown as 14a, 14b . . . 14n in FIG. 1), which can reduce current surges on backup battery 26 by activating each actuator 22 one at a time as opposed to activating all actuators all at once. In other embodiments, sequencer 43 can be configured to activate multiple actuators 22 to fail-safe positions or conditions in any predetermined time sequence as required for any given system. In other embodiments, sequencer 43 can be configured to activate multiple actuators 22a, 22b . . . 22n at a time to fail-safe positions or conditions. In such embodiments, each of actuators 22a, 22b . . . 22n can be supplied power via power line input 32, which can be configured as a common power bus for the actuators. In some embodiments, the current supplied to actuators 22a, 22b . . . 22n can be monitored by current measurement module 46 as electrical power flows therethrough from power redundancy module 31 to power line input 32. In some embodiments, current measurement module 46 can be comprised of one or more of a current shunt, a precision resistor network, a digital electronic circuit, an analogue-to-digital converter, a microcontroller, a microprocessor and analog circuits, and other means as well known to those skilled in the art, to measure the current flowing to power line input 32. This measurement can be conveyed as a current measurement signal via current monitor line 47 from current measurement module 46 to sequencer 43. In some embodiments, sequencer 43 can use the current measurement signal to determine the sequence of when each actuator can be safely turned on without overloading the battery. In some embodiments, sequencer 43 can comprise one or more of a microcontroller, a programmable logic controller, discrete logic, a general-purpose computer, a discrete timer(s), and any other functionally equivalent device as well known to those skilled in the art to create a time delay sequence for operating each actuator.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments described herein.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the embodiments described herein. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

What is claimed is:

1. A method for controlling one or more of a plurality of electric actuators in the event of an interruption of a supply of main electric power operatively coupled to an electric power input disposed on each of the plurality of electric actuators, each of the plurality of electric actuators comprising an actuator control signal input disposed thereon, wherein the actuator control signal input is operatively coupled to an actuator controller, the actuator controller configured to control the plurality of electric actuators with an actuator control signal supplied to the actuator control signal input, the method comprising the steps of:
   (a) monitoring a heartbeat signal supplied to the plurality of electric actuators with a main control unit, the heartbeat signal configured to command the plurality of electric actuators to stay open or to remain in place;
   (b) supplying an alternate source of electric power to the electric power input when the supply of main electric power is interrupted;
   (c) monitoring the alternate source of electric power; and
   (d) disconnecting the actuator control signal from the actuator control signal input of the plurality of electric actuators or supplying a fail-safe command signal to the actuator control signal input of the plurality of electric actuators when the supply of main electric power is interrupted and when the alternate source of electric power is in an error condition, wherein the disconnecting of the actuator control signal, or the supplying of the fail-safe command signal, to the actuator control signal input of the plurality of electric actuators is sequenced to stagger the operation of the plurality of electric actuators thereby limiting peak current required to move all of the plurality of electric actuators to a fail-safe position.

2. The method as set forth in claim 1, further comprising the step of sequencing the disconnecting of the actuator control signal or sequencing the fail-safe command signal to the actuator control signal input of the plurality of electric actuators one at a time.

3. The method as set forth in claim 1, further comprising the step of disconnecting the fail-safe command signal from the actuator control signal input and reconnecting the actuator control signal to the actuator control signal input when the supply of main electric power is restored.

4. The method as set forth in claim 1, further comprising the step of supplying the plurality of electric actuators with the supply main electric power when the supply of main electric power is restored.

5. The method as set forth in claim 1, further comprising the step of supplying an electric power failure signal to the actuator controller when the supply of main electric power is interrupted.

6. The method as set forth in claim 1, further comprising the step of monitoring the actuator control signal and determining if the actuator control signal is within an accepted pre-determined standard or range for the actuator control signal.

7. The method as set forth in claim 6, further comprising the step of moving or operating the plurality of electric actuators to the fail-safe position, condition or state if the actuator control signal is not within the accepted pre-determined standard or range for the actuator control signal.

8. The method as set forth in claim 1, wherein the actuator control signal comprises the heartbeat signal.

9. The method as set forth in claim 1, wherein the main control unit comprises a fault detector circuit configured to monitor the heartbeat signal.

10. A system for controlling one or more of a plurality of electric actuators in the event of an interruption of a supply of main electric power operatively coupled to an electric power input disposed on each of the plurality of electric actuators, each of the plurality of electric actuators comprising an actuator control signal input disposed thereon, wherein the actuator control signal input is operatively coupled to an actuator controller, the actuator controller configured to control the plurality of electric actuators with an actuator control signal supplied to the actuator control signal input, the system comprising:
   (a) a main control unit configured to supply an alternate source of electric power to the electric power input when the supply of main electric power is interrupted, the main control unit further configured to monitor the alternate source of electric power, the main control unit further configured to monitor a heartbeat signal supplied to the plurality of electric actuators by the actuator controller, the heartbeat signal configured to command the plurality of electric actuators to stay open or to remain in place;
   (b) a control signal interface unit configured to disconnect the actuator control signal from the actuator control signal input of the plurality of electric actuators or to supply a fail-safe command signal to the actuator control signal input of the plurality of electric actuators when the supply of main electric power is interrupted and when the alternate source of electric power is in an error condition; and (c) a sequencer configured to sequence the disconnection of the actuator control signal, or to supply the fail-safe command signal, to the actuator control signal input of the plurality of electric actuators to stagger the operation of the plurality of electric actuators thereby limiting peak current required to move all of the plurality of electric actuators to a fail-safe position.

11. The system as set forth in claim 10, wherein the sequencer is configured to sequence the disconnection of the actuator control signal, or the the command signal, to the actuator control signal input of the plurality of electric actuators one at a time.

12. The system as set forth in claim 10, wherein the control signal interface unit is configured to disconnect the fail-safe command signal from the actuator control signal input and to reconnect the actuator control signal to the actuator control signal input when the supply of main electric power is restored.

13. The system as set forth in claim 10, wherein the main control unit is configured to supply the plurality of electric actuators with the supply main electric power when the supply of main electric power is restored.

14. The system as set forth in claim 10, wherein the main control unit is configured to supply an electric power failure signal to the actuator controller when the supply of main electric power is interrupted.

15. The system as set forth in claim 10, wherein the control signal interface unit is configured to monitor the actuator control signal and to determine if the actuator control signal is within an accepted pre-determined standard or range for the actuator control signal.

16. The system as set forth in claim 15, wherein the control signal interface unit is further configured to operate the plurality of electric actuators to the fail-safe position, condition or state if the actuator control signal is not within the accepted pre-determined standard or range for the actuator control signal.

17. The system as set forth in claim 10, wherein the actuator control signal comprises the heartbeat signal.

18. The system as set forth in claim 10, wherein the main control unit comprises a fault detector circuit configured to monitor the heartbeat signal.

* * * * *